(12) United States Patent
Rhodes et al.

(10) Patent No.: US 8,570,185 B2
(45) Date of Patent: Oct. 29, 2013

(54) WIRELESS UNDERWATER HULL INSPECTION SYSTEM

(75) Inventors: Mark Rhodes, West Lothian (GB); Brendan Hyland, Edinburgh (GB)

(73) Assignee: WFS Technologies Ltd., Edinburgh (GB)

(*) Notice: Subject to any disclaimer, the term of this patent is extended or adjusted under 35 U.S.C. 154(b) by 393 days.

(21) Appl. No.: 12/599,319

(22) PCT Filed: Jun. 16, 2008

(86) PCT No.: PCT/GB2008/002056
§ 371 (c)(1),
(2), (4) Date: Jun. 9, 2010

(87) PCT Pub. No.: WO2008/152408
PCT Pub. Date: Dec. 18, 2008

(65) Prior Publication Data
US 2010/0238050 A1   Sep. 23, 2010

(30) Foreign Application Priority Data
Jun. 15, 2007   (GB) .................................. 0711579.3

(51) Int. Cl.
*H04B 13/02* (2006.01)

(52) U.S. Cl.
USPC ............................................ 340/850; 340/851

(58) Field of Classification Search
USPC ............................................ 340/850, 851, 852
See application file for complete search history.

(56) References Cited

U.S. PATENT DOCUMENTS

| 7,301,851 B1* | 11/2007 | Mixon et al. ..................... 367/11 |
| 2008/0048881 A1* | 2/2008 | Safinya et al. ................. 340/852 |
| 2008/0264323 A1* | 10/2008 | Gosling .......................... 114/330 |
| 2010/0245120 A1* | 9/2010 | Porter et al. ................. 340/850 |

FOREIGN PATENT DOCUMENTS

| WO | WO2006/134331 | 12/2006 |
| WO | WO2006134331 | 12/2006 |

* cited by examiner

*Primary Examiner* — Peguy Jean Pierre
(74) *Attorney, Agent, or Firm* — Paul Davis; Mintz Levin

(57) ABSTRACT

An underwater inspection system comprising an underwater mobile inspection station (52) having an electromagnetic antenna (53), the mobile station (52) being adapted to capture inspection data and use the electromagnetic antenna (53) to send information relating to the inspection data to a underwater electromagnetic receiver that has a fixed electromagnetic antenna (55).

18 Claims, 7 Drawing Sheets

WIRELESS UNDERWATER HULL INSPECTION SYSTEM

INTRODUCTION

The present invention relates to a system that employs electromagnetic signalling to allow communications and navigation between a mobile object situated in water under the hull of a vessel and a fixed station.

BACKGROUND OF THE INVENTION

Hull inspection has become increasingly important in recent years, particularly for larger vessels. Visual inspection by divers is a very undesirable prospect and can only be considered in clear waters where visibility is good enough for close inspection. Under-hull working removes the diver's direct escape route to the surface, which is fundamental for safe subsea working.

Remotely Operated Vehicles (ROVs) have been used for hull inspection using video imaging or short range, high resolution, sonar for inspection. ROVs are typically operated from the surface along side the ship and require connection via control wires for control and relay of inspection data. A ship's hull presents many opportunities for control wire snagging and the surface connection restricts manoeuvrability. Wireless communication of control and inspection data with a subsea vehicle would prove particularly advantageous in this application.

To date, acoustic modems have been the dominant choice for underwater wireless communications. However, essentially horizontal communication in the restricted space below a ship's hull is a particularly challenging application for acoustics. For example, in a typical quayside inspection berth there is often less than 10 m clearance between the ship's hull and the seabed. The narrow channel formed by ship's hull on the upper boundary and sea bed in lower boundary, typically with a vertical quayside enclosing a third boundary, creates a severe multi-path environment which makes acoustic communications impractical.

Navigation presents a further problem for hull inspection systems. Inspection data must be accurately associated with its corresponding location. Divers can quickly become disorientated when presented with the uniform inverted surface of a ship's hull and have no accurate frame of reference for relocating interesting features that are identified during inspection. Sonar navigation methods have proven impractical due to the multi-path acoustic environment as outlined above.

SUMMARY OF THE INVENTION

According to the present invention, there is provided an underwater inspection system comprising an underwater mobile inspection station having an electromagnetic antenna, the mobile station being adapted to capture inspection data and use the electromagnetic antenna to send information relating to the inspection data to an underwater electromagnetic receiver that has a fixed electromagnetic antenna. By fixed, it is meant that the fixed receiver is stationary relative to the object under inspection.

By using electromagnetic signals to transfer underwater inspection information from the mobile station to the fixed station, there is provided a simple and effective way for capturing that information, even when the inspection environment is poor, such as when the area being surveyed is an underwater hull.

At least one and preferably both of the mobile and fixed antennas comprises at least one electrically insulated, magnetic coupled antenna.

At least one and preferably both of the mobile and the fixed antennas comprises one or more loop antennas. Where the mobile and fixed antennas are loop antennas, preferably they are substantially horizontally aligned.

The fixed antenna may comprise a plurality of antennas, each with its own transmitter and receiver or transceiver unit. In this case, the location of individual antennas is known and so signals received by these from the mobile station can be used to determine the location of the mobile station.

Preferably, means are provided, for example a processor that is connected or adapted to receive information from each of the fixed plurality of fixed antennas, for comparing the signal strength at each of the individual fixed antennas. This information can be used to determine the most appropriate one of the fixed antennas to use to transmit data and additionally or alternatively information to determine the location the mobile station.

Where location information is determined, this may be used to allow the mobile station to navigate to specific locations in or around the survey area.

Preferably, the fixed station is adapted to send control information to the mobile station using the fixed antenna.

The mobile station is preferably an unmanned autonomous underwater vehicle.

Means may be provided in each of the mobile and fixed stations for implementing a digital modulation scheme for communicating data between the mobile and stationary nodes.

The mobile station may be connected to a modem, thereby providing a two-way communications capability.

The fixed antenna may be connected to means, for example a radio modem, adapted to relay data to a control location, typically on the surface, via a wired or radio link.

According to another aspect of the invention, there is provided an inspection berth for a ship that includes one or more electromagnetic antennas, preferably positioned in a base thereof.

BRIEF DESCRIPTION OF THE DRAWINGS

Various aspects of the invention will now be described by way of example only and with reference to the accompanying drawings, of which.

DETAILED DESCRIPTION OF THE DRAWINGS

The present invention relates to an underwater electromagnetic inspection system that uses electromagnetic signals to allow communication between a mobile station located beneath a ship hull and a stationary antenna. Our pending patent application "Underwater Communications System" PCT/GB2006/002123, the contents of which are incorporated herein by reference, describes how underwater electromagnetic communication may be accomplished over useful distances.

Figure 1:
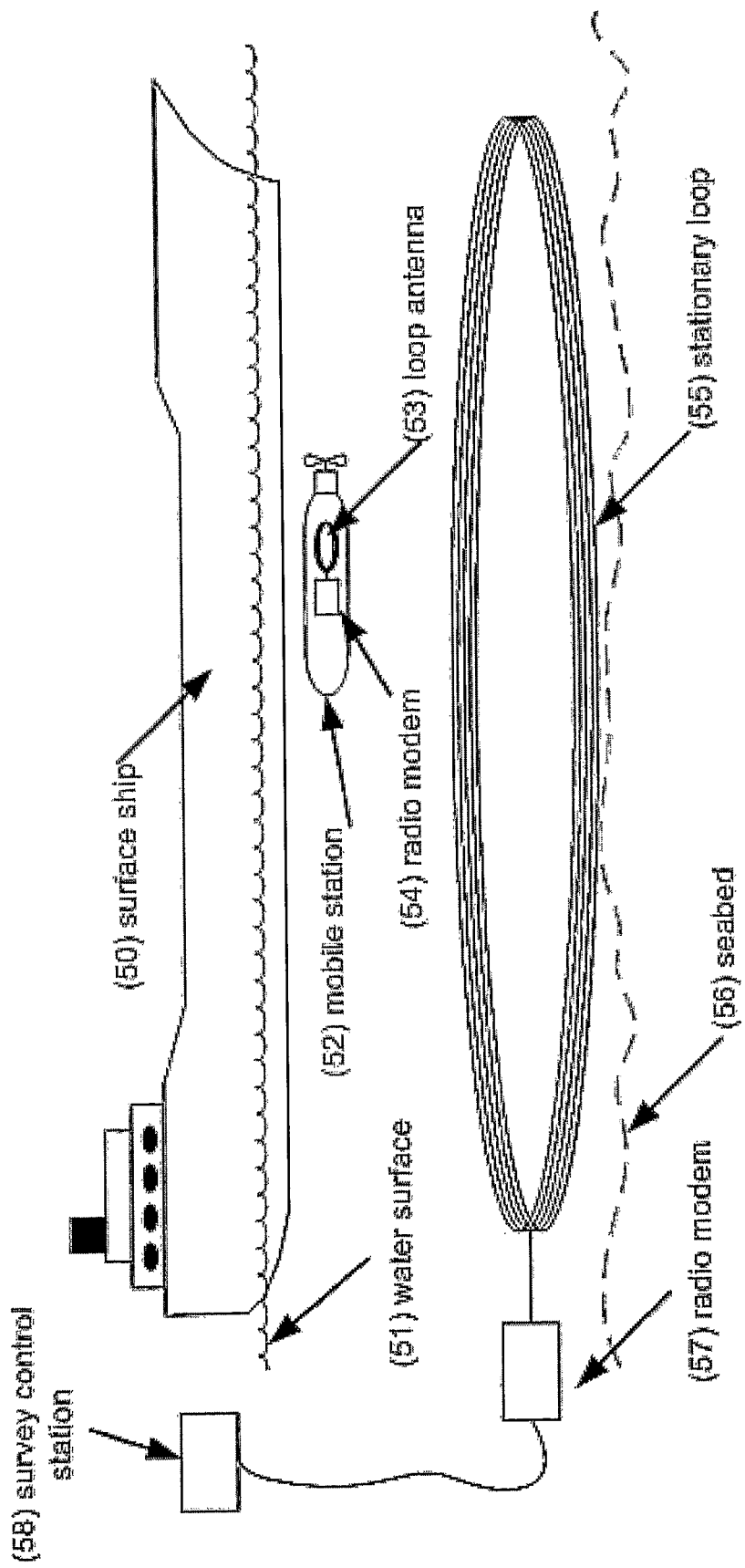
FIG. 1 is a schematic diagram of an underwater electromagnetic communication system for allowing communication between an unmanned vehicle and a stationary single loop located under a ship hull.
Figure 2:
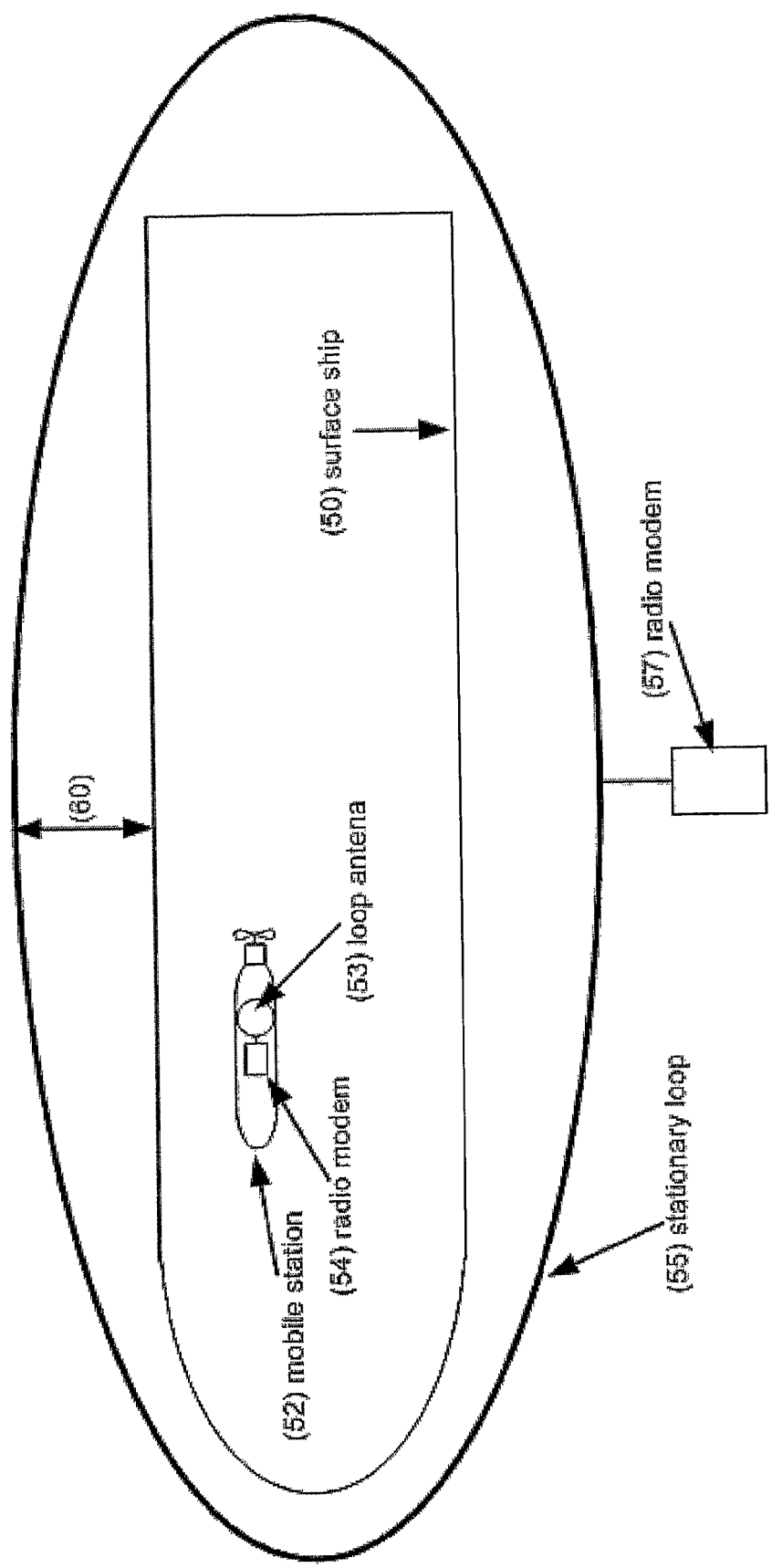
FIG. 2 is a plan view of the system of FIG. 1.

FIGS. 1 and 2 show a system for underwater inspection of the hull of a surface ship 50 that has a portion of its hull below the water line 51. The system uses electromagnetic communications to transfer inspection data to a remote station. The inspection system has an unmanned mobile station, typically an unmanned mobile inspection platform 52, which can move around the underwater environment, and a fixed station that is located under the surface ship 50. Associated with the mobile inspection platform 52, typically in or on the platform, are data collection means, for example a camera or short range, high resolution, sonar (not shown), and a horizontally deployed loop antenna 53 that is connected to a radio modem transceiver 54. Resting horizontally on the seabed 56, there is a single stationary antenna 55 that is connected to a radio transceiver modem 57. These form the fixed station. Modem 57 is connected via a wire or radio link to a survey control point 58.

The antennas 53 and 55 are adapted for underwater usage. In a preferred embodiment, the antennas 53 and 55 are waterproof, electrically insulated magnetic coupled antennas. Using magnetically coupled antennas achieves lower transmission loss for a signal launched in water compared to conventional electric field coupled electromagnetic antennas of the types commonly used in free space. This is because the through-water path is in a medium of significant conductivity that, while immediately attenuating an electrical field, leaves a magnetic field largely unaffected.

As can be seen from FIG. 2, the stationary loop 55 encloses an area that is larger than the survey area. In this case, the loop 55 is larger than the outline or footprint of the ship that is being surveyed. If the ship's hull outline 50 defines the survey area, then the loop antenna should be sized and positioned so that round its entire circumference it is spaced from the survey area by a dimension 60 that is at least one water depth. This is important to avoid a signal null that may be present above and slightly inside the loop circumference for the recommended horizontal antenna arrangement. The stationary antenna 55 and the mobile antenna 53 are aligned in use so that they are substantially parallel, their plains being separated by the communication distance.

In use, the mobile inspection platform 52 travels under the hull collecting inspection data using the data collection means. Collected data is sent from the transceiver 54 in the mobile platform via the electromagnetic antenna 53 to the stationary antenna 55 of the fixed station. The received data is processed using the radio modem 57, which subsequently relays data to the survey control point 58. In this way, inspection data can easily captured and transferred to the control station. In addition, because both the fixed and mobile stations have transceivers, two-way communication is possible thereby allowing control data to be sent from the control station 58 to the mobile platform 52.

The single stationary antenna system of FIGS. 1 and 2 can be rapidly deployed and provides good signal strength for coverage of the whole working area of the mobile inspection platform.

Figure 3:
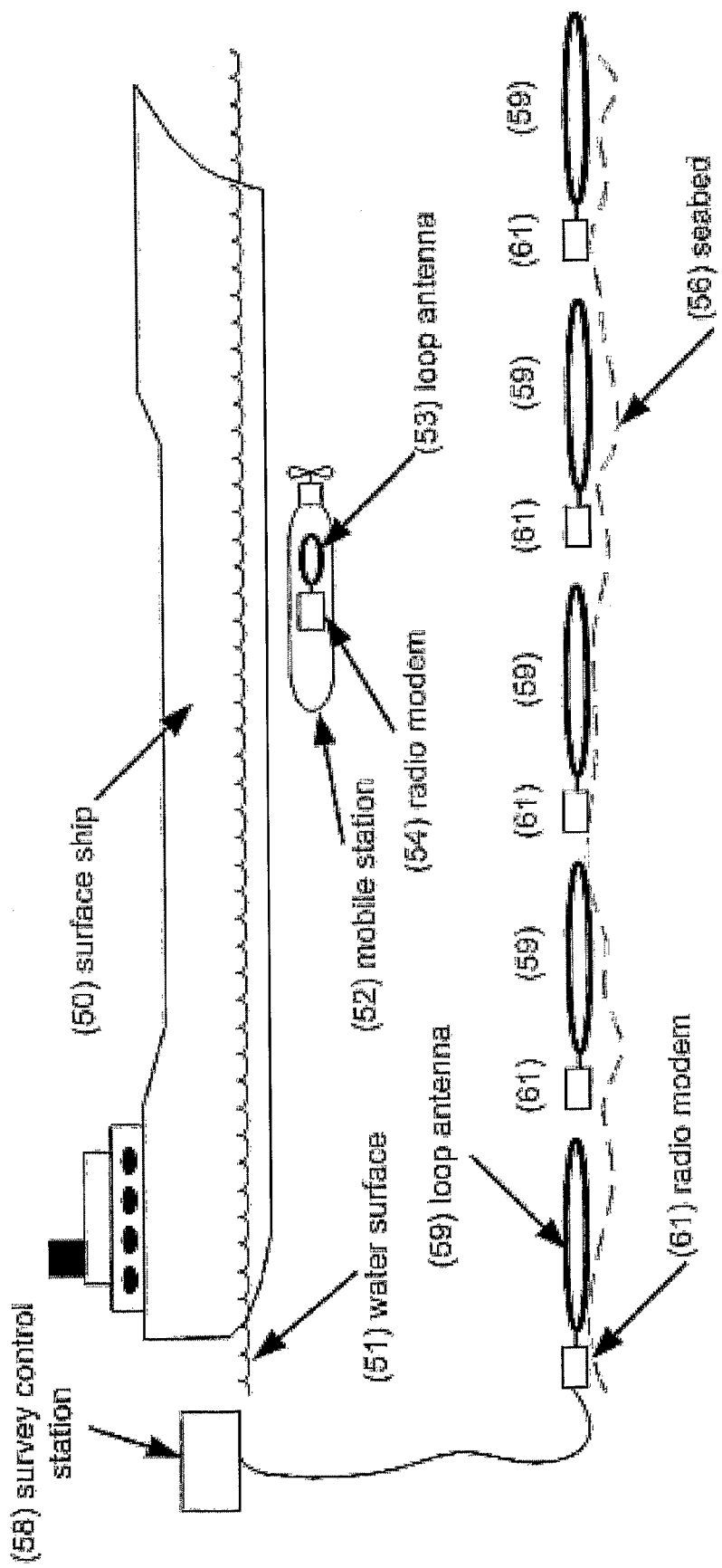
FIG. 3 is a schematic diagram of an underwater electromagnetic communication and navigation system for allowing communication between an unmanned vehicle and an array of stationary loop antennas.
Figure 4:
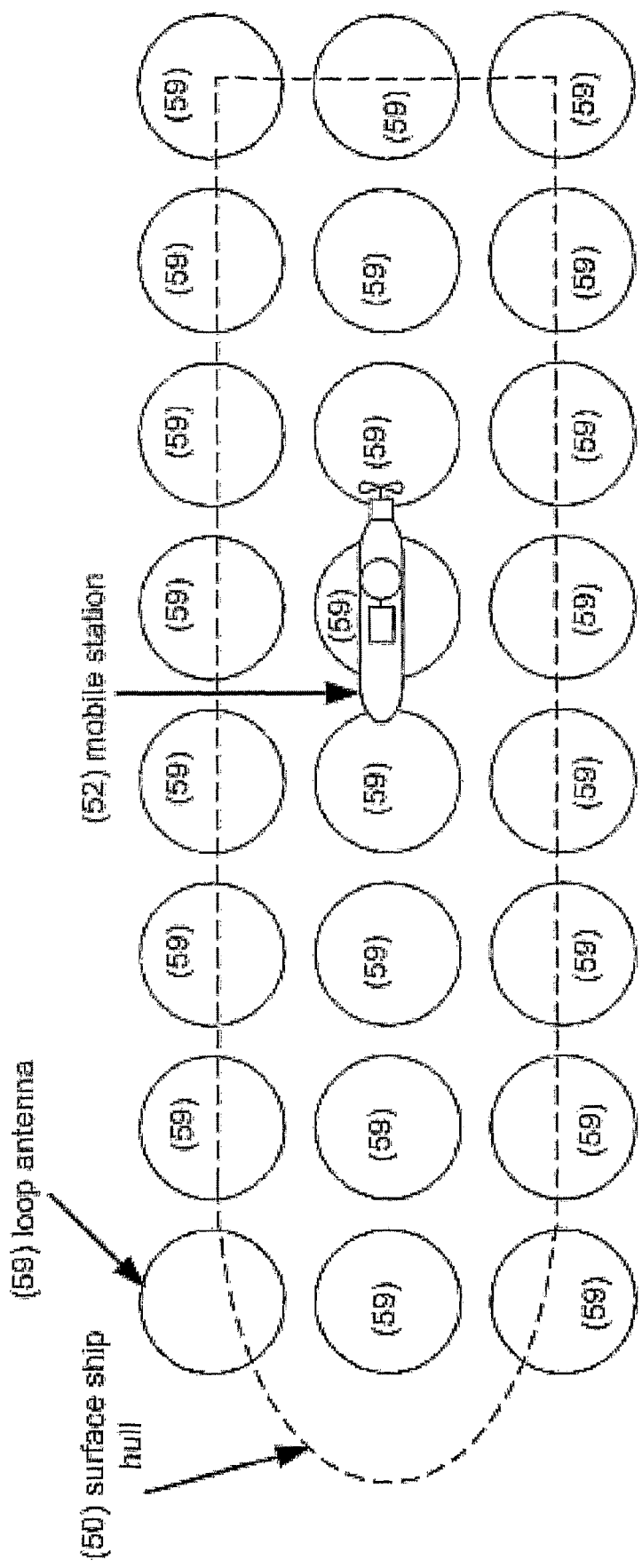
FIG. 4 is a plan view of the system of FIG. 3.

FIGS. 3 and 4 show an underwater electromagnetic inspection system that allows for both communication and navigation. As for FIG. 1, the system has an unmanned vehicle, for example a mobile inspection platform 52 as described above, but in this case rather than a single large stationary loop antenna, an array of stationary loop antennas 59 is provided. These rest horizontally on the seabed 56 in a regular array covering the whole of the ship hull 50 survey area. Each antenna is preferably identical 59. As before, each antenna 59 is adapted for underwater usage and in a preferred embodiment is a waterproof, electrically insulated magnetic coupled antenna.

The array of antennas 59 can be formed in any suitable manner. For example, a net structure could be used to physically connect each antenna. This could be constructed on the shore and would achieve accurate relative positioning of the antennas, which would be maintained when the net was deployed at the seabed.

In practice, the mobile antenna 53 is aligned so that it and the stationary antennas 59 are substantially parallel, their plains being separated by the communication distance. Each antenna in the array 59 is connected to a transceiver 61, for example a radio transceiver modem. Each transceiver 61 is linked to the survey control station 58 via a wired or wireless link.

The system is arranged to provide communications between a single array antenna 61 and the mobile unit, the individual array antenna 61 being selected to provide the most effective link with the mobile vehicle. Typically, the selected antenna 61 is directly beneath the mobile unit. Comparison of signal strength of communication links for each antenna in the array allows calculation of the mobile vehicle location. This provides position information that can be associated with the inspection data provided by the mobile platform.

In practice, it is preferable to implement a system based on time spaced transmissions from single antennas in the array to avoid a complex magnetic field interaction pattern, as this inevitably results in communications signal null points. This is because an array of closely spaced adjacent loops driven in phase results in some degree of field cancellation. For example, in the limit of square antenna loops arranged in contact with their neighbours, a loop in the centre of the array with four neighbouring loops will have its magnetic field completely cancelled. This operational issue is overcome if the system is arranged so only one loop in the array transmits at any given time.

The functionality described for a multi-antenna array system could be achieved through many alternative protocol implementations. For example, the mobile vehicle may initiate operation by transmitting a signal. All array receivers are active and received signal strength is measured for each. Active communications is achieved through the stationary unit with the largest received signal and only this unit responds with a transmit signal. All receivers continue to operate and, as the vehicle manoeuvres around the hull, active communications can hand over to the strongest available link for each communications packet.

All the stationary array antennas are constructed to an identical design and comparison of received signal strength provides positional information for the mobile vehicle. The smaller the array antenna loops the greater positional accuracy, but this requirement conflicts with the property of magnetic field generation. Communication is achieved through the magnetic field and signal strength increases with a larger loop area. This property may dominate the need for navigational accuracy and will form a design trade off for each system implementation.

Further implementation details of an underwater navigation system based on electromagnetic signal magnitude are disclosed in our co-pending application "Underwater Navigation System" PCT/GB2006/002111, the details of which are hereby incorporated by reference.

The stationary antenna systems described need only be stationary with respect to the ship hull. This can be achieved by deployment on the seabed while keeping the ship stationary or, for a travelling ship, with an antenna only stationary with respect to the ship i.e. attached or tracking. For example, the net structure of antennas as described above could be held in contact with the ship's hull to provide increased navigational accuracy and communications bandwidth by minimising the separation of the mobile and stationary antennas.

Figure 5:
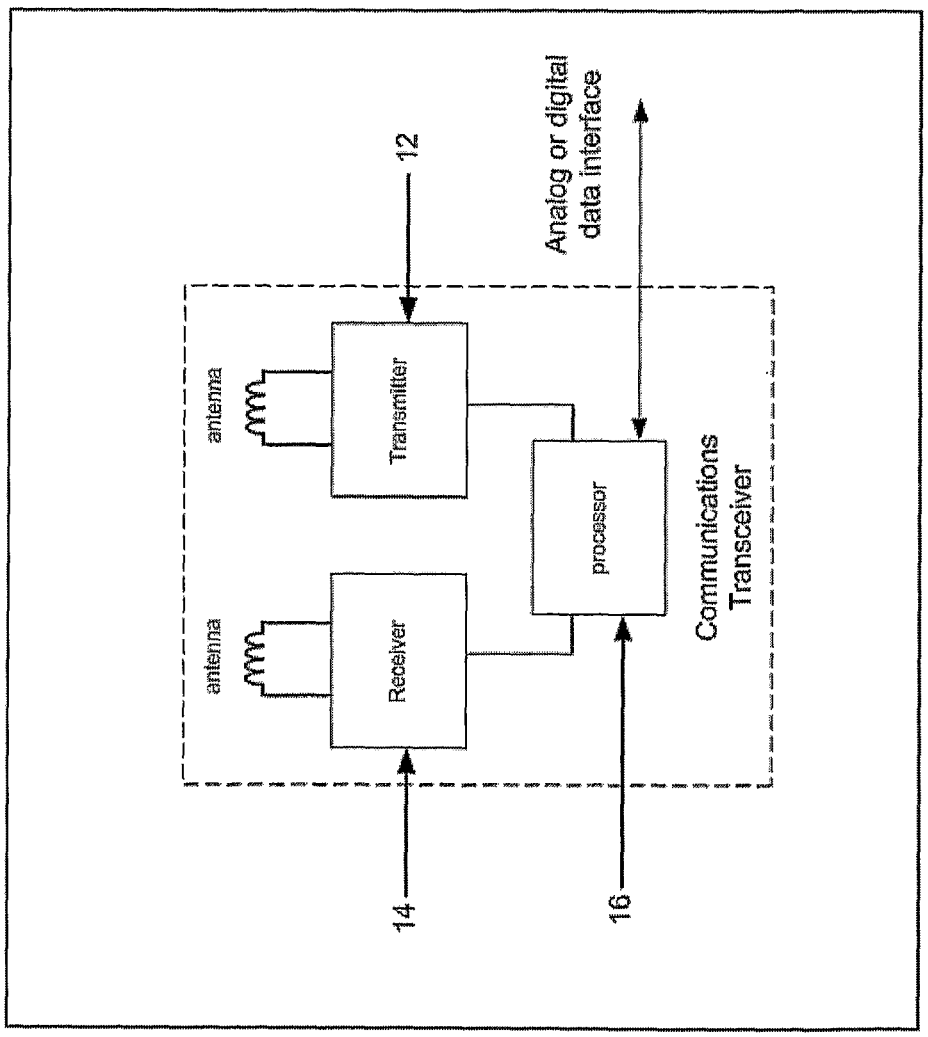
FIG. 5 is a block diagram of an underwater transceiver.

Each of the mobile and stationary stations described above uses a communications transceiver 54, 61 for processing signals received at the various antennas. FIG. 5 shows a typical example. This has a transmitter 12, a receiver 14 and a processor 16 that can be connected to an analogue or digital data interface (not shown). Both the transmitter and receiver 12 and 14 respectively are connected to an antenna. Alternatively, a single antenna can be shared between transmitter and receiver, as is the case for the embodiments of FIGS. 1 to 4.

Figure 6:
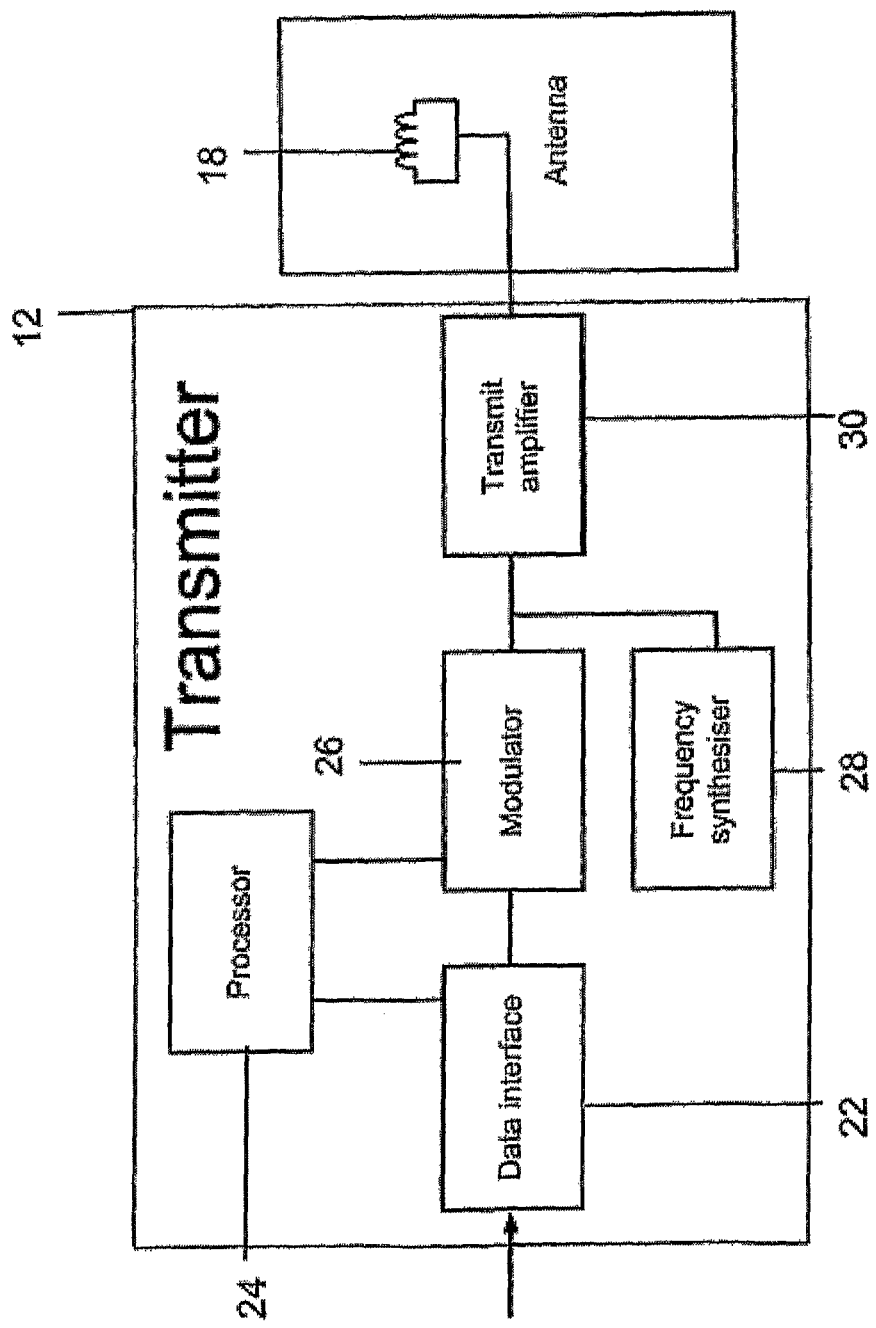
FIG. 6 is a block diagram of an underwater transmitter for use in the transceiver of FIG. 5

FIG. 6 shows an example of a transmitter 12 for use in the transceiver of FIG. 5. This has a data interface 22 that is connected to each of a processor 24 and a modulator 26. The modulator 26 is provided to encode data onto a carrier wave. Typically, a digital modulation scheme is employed to carry communications data between the mobile and fixed stations. At an output of the modulator 26 are a frequency synthesiser 28 that provides a local oscillator signal for up-conversion of the modulated carrier and a transmit amplifier 30, which is connected to the underwater, electrically insulated magnetic coupled antenna 18. Preferably, the data is compressed prior to transmission. This causes the occupied transmission bandwidth to be reduced allowing use of a lower carrier frequency, which leads to lower attenuation and in turn allows communication over greater transmission distances. In use, the transmitter processor 24 is operable to cause electromagnetic communication signals to be transmitted via the antenna at a selected carrier frequency.

Figure 7:
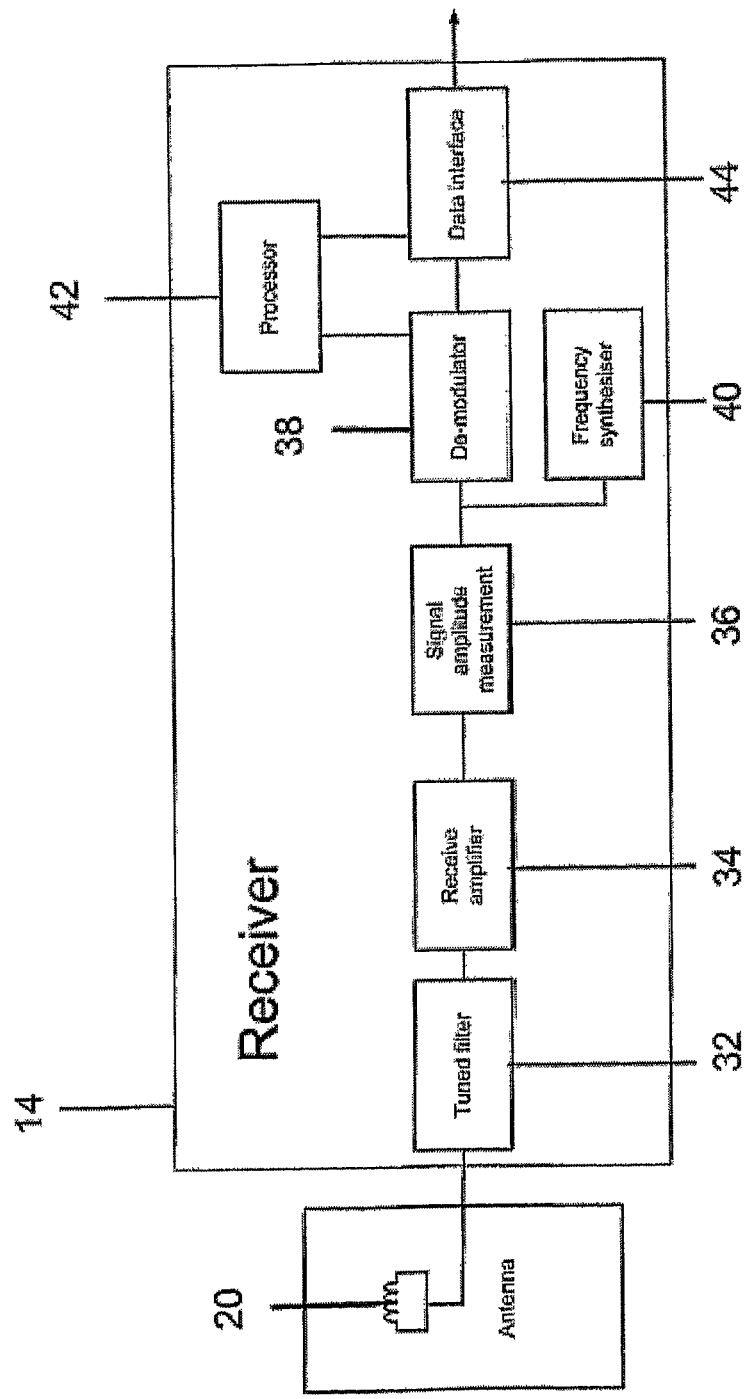
FIG. 7 is a block diagram of an underwater receiver for use in the transceiver of FIG. 5.

FIG. 7 shows an example of a receiver 14 for use with the transceiver of FIG. 5. This is shown connected to one of the antennas. Connected to the antenna is a tuned filter 32 that is in turn connected to a receive amplifier 34. At the output of the amplifier 34 is a signal amplitude measurement module 36 that is coupled to a de-modulator 38 and a frequency synthesiser 40, which provides a local oscillator signal for down conversion of the modulated carrier. Connected to the de-modulator 38 are a processor 42 and a data interface 44, which is also connected to the processor 42. The data interface 44 is provided for transferring data from the receiver 14 to a control or monitoring means, such as another on-board processor, which may be located in the mobile device or at another remote location.

In both the systems described above the operating signal carrier frequency depends on the particular application. The carrier frequency is selected as a function of the data transfer rate and the distance over which transmission has to occur. For example, for short-range communications where a high data rate is required, a relatively high frequency would be used, for example above 1 MHz. In contrast for long-range communications where attenuation losses are likely to be a problem, relatively low frequencies would be used, for example below 1 Mhz, and in many cases below 100 kHz. For a typical hull to seabed distance of 10 m the under hull communications system described will allow the transmission of >10 kbps data from the mobile station to a stationary antenna for relay to the surface.

The present invention provides the key capability of free maneuvering mobile submerged inspection platform relaying live data through a seabed antenna to a human assessor on the surface. The inspection data can be evaluated during the survey and the mobile station interactively directed accordingly. The system will be capable of relaying video or sonar data to the surface for identification and classification of objects or damage on the hull. The system provides two-way communications allowing remote control of the mobile submerged platform.

The present invention provides an inspection system configured to overcome the key restrictive operational problems associated with an operational space bounded by a ship's hull as an upper surface, the seabed as lower boundary and, typically quayside as a third border in a space occupied by sea or fresh water. It also advantageously provides a wireless navigation capability that allows the location of any detected object or possible defect to be recorded, so that the unmanned station can return to the location to carry out corrective action.

Whilst the systems and methods described above are generally applicable to seawater, fresh water and any brackish composition in between, because relatively pure fresh water environments exhibit different electromagnetic propagation properties from saline seawater, different operating conditions may be needed in different environments. Any optimisation required for specific saline constitutions will be obvious to any practitioner skilled in this area.

A skilled person will appreciate that variations of the disclosed arrangements are possible without departing from the invention. For example, although the invention is described with reference to the inspection of a floating ship's hull, in practice the system could equally be applied to inspection of any floating or totally submerged structure. Also, although the mobile inspection platform is generally described as a free floating unmanned vehicle, any system that may be used to position mobile inspection equipment could be used, for example a wheeled vehicle running on the seabed or inverted on the ship's hull. Equally, although the fixed antenna is shown generally on the seabed, it could be provided in the base of a quayside inspection berth. Furthermore, although the antennas may be constructed as magnetically coupled conduction loops, other antenna types are not excluded, for example dipole conductive electrode antennas. Accordingly the above description of the specific embodiment is made by way of example only and not for the purposes of limitation. It will be understood that the description and examples given are representative only, and that many other related applications and implementations come within the scope of this invention.

The invention claimed is:

1. An underwater inspection system comprising-an underwater mobile inspection station having an electromagnetic antenna, the mobile station being adapted to capture inspection data and use the electromagnetic antenna to send information relating to the inspection data to a remote underwater electromagnetic receiver that has an electromagnetic antenna fixed relative to an object under inspection wherein means are provided in each of the mobile station and fixed antenna for implementing a digital modulation scheme for communicating data.

2. An underwater inspection system as claimed in claim 1 wherein at least one of the mobile and fixed antennas comprises at least one electrically insulated, magnetic coupled antenna.

3. An underwater inspection system as claimed in claim 1 wherein at least one of the mobile and fixed antennas comprises one or more loop antennas.

4. An underwater inspection system as claimed in claim 3, wherein both the mobile and fixed antennas are loop antennas that in use are substantially horizontally aligned.

5. An underwater inspection system as claimed in claim 3 wherein the fixed antenna is a loop antenna that extends around an area that is to be surveyed and is spaced from the target survey area by an amount that is at least the depth of the water.

6. An underwater inspection system as claimed in claim 1 wherein the fixed antenna comprises a plurality of antennas, each with its own receiver or transceiver unit.

7. An underwater inspection system as claimed in claim 6, wherein each individual fixed antenna has a known position and means are provided for determining the position of the mobile station using signals received at one or more of the fixed antennas.

8. An underwater inspection system as claimed in claim 6 wherein means are provided for comparing signal strength at each of the individual fixed antennas.

9. An underwater inspection system as claimed in claim 8 comprising means for using the signal strength to determine the most appropriate one of the fixed antennas to use to capture the inspection data.

10. An underwater inspection system as claimed in claim 8 comprising means for using the signal strength to determine the location the mobile station.

11. An underwater inspection system as claimed in claim 10 comprising means for using the location information to allow the mobile station to navigate in or around the survey area.

12. An underwater inspection system as claimed in claim 1 wherein the fixed station is adapted to send control information to the mobile station using the fixed antenna.

13. An underwater inspection system as claimed in claim 1 wherein the mobile station is an unmanned autonomous underwater vehicle.

14. An underwater inspection system as claimed in claim 1 wherein the fixed antenna is adapted to relay data to a control location on the surface via a wired or radio link.

15. An underwater inspection system as claimed claim 14 wherein the fixed antenna is connected to a radio modem that is adapted to relay data to a control location on the surface via a wired or radio link.

16. An underwater inspection system as claimed in claim 1 wherein the fixed antenna is carried on the seabed.

17. An underwater inspection system as claimed in claim 1 wherein the fixed antenna is carried on or attached to an object that is being inspected.

18. An inspection berth for a ship as claimed in claim 1 wherein one or more electromagnetic antennas, preferably positioned in a base thereof.

\* \* \* \* \*